(12) United States Patent
Chen et al.

(10) Patent No.: US 11,382,078 B2
(45) Date of Patent: Jul. 5, 2022

(54) SIGNAL SENDING METHOD AND APPARATUS, AND SIGNAL RECEIVING METHOD AND APPARATUS

(71) Applicant: Huawei Technologies Co., Ltd., Shenzhen (CN)

(72) Inventors: Zhe Chen, Shenzhen (CN); Zhihu Luo, Beijing (CN); Zhe Jin, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 37 days.

(21) Appl. No.: 16/786,408

(22) Filed: Feb. 10, 2020

(65) Prior Publication Data

US 2020/0187197 A1 Jun. 11, 2020

Related U.S. Application Data

(63) Continuation of application No. PCT/CN2017/096960, filed on Aug. 10, 2017.

(51) Int. Cl.
*H04W 72/04* (2009.01)
*H04W 24/10* (2009.01)
*H04W 56/00* (2009.01)

(52) U.S. Cl.
CPC ....... *H04W 72/0413* (2013.01); *H04W 24/10* (2013.01); *H04W 56/001* (2013.01); *H04W 72/0446* (2013.01); *H04W 72/0453* (2013.01)

(58) Field of Classification Search
CPC ............. H04W 72/0413; H04W 24/10; H04W 56/001; H04W 72/0446; H04W 72/0453;
(Continued)

(56) References Cited

U.S. PATENT DOCUMENTS 9,661,663 B1 5/2017 Lin et al.
9,756,662 B2 * 9/2017 Lin ...................... H04B 1/7143
(Continued)

FOREIGN PATENT DOCUMENTS

CN 106301738 A 1/2017
CN 106921468 A 7/2017
(Continued)

OTHER PUBLICATIONS

"New WID: Further enhancement of NB-IoT," 3GPP TSG RAN Meeting #75, RP-170676, Dubrovnik, Croatia, total 5 pages, 3rd Generation Partnership Project, Valbonne, France (Mar. 6 -9, 2017).

*Primary Examiner* — Brian T O'Connor
(74) *Attorney, Agent, or Firm* — Leydig, Voit & Mayer, Ltd.

(57) ABSTRACT

A signal sending method, a signal receiving method, and an apparatus are provided. The method includes: generating, by a terminal device, a first symbol group that carries a first preamble, where the first symbol group includes four groups of symbols; and sending, by the terminal device, the first symbol group to a network device in K groups of uplink subframes, where any two groups of uplink subframes in the K groups of uplink subframes are not adjacent, each group of uplink subframes in the K groups of uplink subframes include at least one uplink subframe, and uplink subframes included in the group of uplink subframes are continuous subframes, where K is a positive integer greater than 1 and less than or equal to 4.

20 Claims, 8 Drawing Sheets

(58) Field of Classification Search
CPC . H04L 5/0048; H04L 5/0012; H04L 27/2605; H04L 27/261; H04L 5/146; H04B 1/713
See application file for complete search history.

(56) References Cited

U.S. PATENT DOCUMENTS

| | | | | |
|---|---|---|---|---|
| 10,128,996 B2* | 11/2018 | Seo | ........................ | H04L 5/0082 |
| 10,291,451 B2* | 5/2019 | Wang | ................... | H04L 27/2602 |
| 10,454,657 B2* | 10/2019 | Bhattad | ................. | H04L 1/0068 |
| 10,454,658 B2* | 10/2019 | Bhattad | ................. | H04L 5/0053 |
| 10,454,659 B2* | 10/2019 | Bhattad | ............... | H04L 27/2613 |
| 10,616,919 B2* | 4/2020 | Adachi | ................. | H04L 12/189 |
| 10,721,052 B2* | 7/2020 | Bhattad | ................. | H04L 1/0067 |
| 10,764,021 B2* | 9/2020 | Bhattad | ................. | H04L 5/0007 |
| 10,819,495 B2* | 10/2020 | Bhattad | ............... | H04L 27/2613 |
| 10,863,484 B2* | 12/2020 | Islam | ................. | H04W 74/0833 |
| 10,951,384 B2* | 3/2021 | Cao | ........................ | H04W 84/18 |
| 11,032,853 B2* | 6/2021 | Kim | ................... | H04L 27/2607 |
| 11,129,190 B2* | 9/2021 | Kim | ................... | H04W 72/14 |
| 2013/0188620 A1* | 7/2013 | Dinan | ................. | H04W 74/002 |
| | | | | 370/336 |
| 2013/0272229 A1* | 10/2013 | Dinan | ........................ | H04L 5/14 |
| | | | | 370/329 |
| 2016/0150570 A1 | 5/2016 | Wang et al. | | |
| 2016/0295522 A1* | 10/2016 | Qin | ........................ | H04W 52/28 |
| 2016/0316473 A1* | 10/2016 | Wang | ................ | H04W 74/0816 |
| 2017/0359114 A1* | 12/2017 | Akkarakaran | ........ | H04B 7/0695 |
| 2018/0077723 A1* | 3/2018 | Adachi | ................. | H04L 5/0091 |
| 2018/0248671 A1* | 8/2018 | Bhattad | ................. | H04L 1/0068 |
| 2018/0294942 A1* | 10/2018 | Byun | .................... | H04L 5/1469 |
| 2018/0352524 A1* | 12/2018 | Abedini | ................... | H04L 5/005 |
| 2019/0007951 A1* | 1/2019 | Kwak | ................... | H04L 1/1887 |
| 2019/0013897 A1 | 1/2019 | Chen et al. | | |
| 2019/0274168 A1 | 9/2019 | Hwang et al. | | |
| 2019/0387508 A1* | 12/2019 | Park | .................... | H04L 27/2607 |
| 2020/0068616 A1* | 2/2020 | Qian | ................... | H04W 74/0833 |
| 2020/0068620 A1* | 2/2020 | Kim | ................... | H04L 5/0053 |
| 2020/0146107 A1* | 5/2020 | Xiong | ................... | H04W 76/27 |
| 2020/0260495 A1* | 8/2020 | Kim | ................... | H04W 74/006 |
| 2021/0235412 A1* | 7/2021 | Chen | ................... | H04W 64/00 |

FOREIGN PATENT DOCUMENTS

| | | |
|---|---|---|
| CN | 106937354 A | 7/2017 |
| CN | 106982110 A | 7/2017 |
| CN | 110892777 A | 3/2020 |
| EP | 3606260 A1 | 2/2020 |
| WO | 2016203750 A1 | 12/2016 |
| WO | 2017052326 A1 | 3/2017 |
| WO | 2017105005 A1 | 6/2017 |

* cited by examiner

SIGNAL SENDING METHOD AND APPARATUS, AND SIGNAL RECEIVING METHOD AND APPARATUS

CROSS-REFERENCE TO RELATED APPLICATIONS

This application is a continuation of International Application No. PCT/CN2017/096960, filed on Aug. 10, 2017, the disclosure of which is hereby incorporated by reference in its entirety.

TECHNICAL FIELD

Embodiments of this application relate to the field of wireless communications technologies, and in particular, to a signal sending method, a signal receiving method, and an apparatus.

BACKGROUND

A mobile communications standards organization, that is, the 3rd generation partnership project (3GPP), proposes a narrowband internet of things (NB-IOT) technology. A device that supports NB-IoT uses a frequency band with a bandwidth of 180 kHz during data transmission, and supports operating in a standalone mode (Standalone operation), a guard band mode (Guardband operation), or an in-band mode (In-band operation). The in-band mode means that one or more resource blocks in one carrier in a long term evolution (LTE) system are used to transmit NB-IoT service data. A bandwidth of one resource block is 180 kHz.

Similar to LTE, the NB-IOT technology includes time division duplex (TDD) NB-IoT and frequency division duplex (FDD) NB-IoT. In the NB-IOT technology, a terminal device needs to access a base station in a random access manner. In FDD NB-IoT, a terminal device needs to send a random access preamble on a narrowband physical random access channel (NPRACH). One preamble includes one or more repeated units, each repeated unit includes four groups of symbols, and each group of symbols have a length of at least 1.4 ms. To be specific, continuous uplink resources occupied by one preamble have a time length of at least 5.6 ms. However, for TDD NB-IoT in which the in-band mode is used for deployment, continuous uplink resources has a time length of at most three subframes (to be specific, 3 ms). Therefore, a terminal device cannot send a preamble to a network device in three subframes. In conclusion, in TDD NB-IoT, how the terminal device sends a preamble is a problem to be resolved urgently.

SUMMARY

An objective of embodiments of this application is to provide a signal sending method and apparatus, and a signal receiving method and apparatus, to resolve a problem that a terminal device cannot send a preamble in TDD NB-IOT.

According to a first aspect, an embodiment of this application provides a signal sending method, including:
generating, by a terminal device, a first symbol group that carries a first preamble, where the first symbol group includes four groups of symbols; and
sending, by the terminal device, the first symbol group to a network device in K groups of uplink subframes, where any two groups of uplink subframes in the K groups of uplink subframes are not adjacent, each group of uplink subframes in the K groups of uplink subframes include at least one uplink subframe, and uplink subframes included in the group of uplink subframes are continuous subframes, where K is a positive integer greater than 1 and less than or equal to 4.

According to the foregoing method, the terminal device sends the first preamble to the network device in the K groups of uplink subframes, to transmit, in TDD NB-IoT, the preamble in the K groups of uplink subframes without changing a hardware structure of the terminal device. Even if the terminal device operates in an in-band mode in TDD NB-IoT, the terminal device may still transmit the preamble by using uplink resources that are dispersed in the K groups of the uplink subframes, to maintain an existing preamble signal structure to maximum extent, so that a dual-mode terminal device that supports TDD/FDD NB-IoT can send a preamble signal by using a same set of transmit apparatus, thereby reducing costs of the dual-mode terminal device that needs to support TDD/FDD NB-IoT.

In an optional implementation, K is 2, and each group of uplink subframes in the K groups of uplink subframes are used to send two groups of symbols in the first symbol group.

In the foregoing method, the first symbol group is sent in two groups of uplink subframes, so that a sending period of the first preamble can be reduced as much as possible, thereby reducing a latency of the first preamble and improving a system.

In an optional implementation, K is 4, and each group of uplink subframes in the K groups of uplink subframes are used to send one group of symbols in the first symbol group.

In the foregoing solution, the first symbol group that carries the first preamble is sent in four groups of uplink subframes, so that the preamble can be sent while an existing preamble signal structure is maintained, and the network device can send the preamble in TDD NB-IoT, thereby improving compatibility between TDD NB-IoT and a TDD LIE system.

In an optional implementation, the method further includes: sending, by the terminal device, a second symbol group to the network device in the K groups of uplink subframes, where the second symbol group is used to carry a second preamble.

In the foregoing method, the terminal device simultaneously sends two preambles, to reduce impact of a frequency offset and a Doppler frequency shift on uplink synchronization performance, and improve uplink synchronization precision.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

According to a second aspect, an embodiment of this application provides a terminal device, where the terminal device includes a memory, a transceiver, and a processor. The memory is configured to store an instruction. The processor is configured to execute the instruction stored in the memory and control the transceiver to receive and send a signal. When the processor executes the instruction stored in the memory, the terminal device is configured to perform the method in any one of the first aspect or the possible designs of the first aspect.

According to a third aspect, an embodiment of this application provides a terminal device configured to implement any method in the first aspect or the possible designs of the first aspect. The terminal device includes corresponding functional modules respectively configured to implement steps in the foregoing method, for example, includes a processing unit, a transceiver unit, a processing unit, and the like.

According to a fourth aspect, an embodiment of this application provides a computer-readable storage medium, where the computer storage medium stores a computer readable instruction, and when the computer readable instruction is read and executed by a computer, the computer is enabled to perform the method in any one of the first aspect or the possible designs of the first aspect.

According to a fifth aspect, an embodiment of this application provides a computer program product, and when the computer program product is read and executed by a computer, the computer is enabled to perform the method in any one of the first aspect or the possible designs of the first aspect.

According to a sixth aspect, an embodiment of this application provides a chip, where the chip is connected to a memory, and is configured to read and execute a software program stored in the memory, to implement the method in any one of the first aspect or the possible designs of the first aspect.

According to a seventh aspect, an embodiment of this application provides a signal receiving method, including:

receiving, by a network device, a first symbol group sent by a terminal device in K groups of uplink subframes, where any two groups of uplink subframes in the K groups of uplink subframes are not adjacent; the first symbol group is used to carry a first preamble, and the first symbol group includes four groups of symbols; and each group of uplink subframes in the K groups of uplink subframes include at least one uplink subframe, and uplink subframes included in the group of uplink subframes are continuous subframes, where K is a positive integer greater than 1 and less than or equal to 4; and sending, by the network device, a random access response to the terminal device.

In an optional implementation, K is 2; and each group of uplink subframes in the K groups of uplink subframes are used to send two groups of symbols in the first symbol group.

In an optional implementation, K is 4; and each group of uplink subframes in the K groups of uplink subframes are used to send one group of symbols in the first symbol group.

In an optional implementation, the method further includes:

receiving, by the network device, a second symbol group in the K groups of uplink subframes, where the second symbol group is used to carry a second preamble.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

According to an eighth aspect, an embodiment of this application provides a network device, where the network device includes a memory, a transceiver, and a processor. The memory is configured to store an instruction. The processor is configured to execute the instruction stored in the memory and control the transceiver to receive and send a signal, and when the processor executes the instruction stored in the memory, the network device is configured to perform the method in any one of the seventh aspect or the possible designs of the seventh aspect.

According to a ninth aspect, an embodiment of this application provides a network device configured to implement the method in any one of the seventh aspect or the possible designs of the seventh aspect. The network device includes corresponding functional modules respectively configured to implement steps in the foregoing method, for example, includes a processing unit, a transceiver unit, a processing unit, and the like.

According to a tenth aspect, an embodiment of this application provides a computer-readable storage medium, where the computer storage medium stores a computer readable instruction, and when the computer readable instruction is read and executed by a computer, the computer is enabled to perform the method in any one of the seventh aspect or the possible designs of the seventh aspect.

According to an eleventh aspect, an embodiment of this application provides a computer program product, and when the computer program product is read and executed by a computer, the computer is enabled to perform the method in any one of the seventh aspect or the possible designs of the seventh aspect.

According to a twelfth aspect, an embodiment of this application provides a chip, where the chip is connected to a memory, and is configured to read and execute a software program stored in the memory, to implement the method in any one of the seventh aspect or the possible designs of the seventh aspect.

DESCRIPTION OF EMBODIMENTS

The following further describes in detail the technical solutions of the embodiments of this application with reference to the accompanying drawings.

The embodiments of this application may be applied to various mobile communications systems, for example, mobile communications systems such as a new radio (NR) system, a global system for mobile communications (GSM) system, a code division multiple access (CDMA) system, a wideband code division multiple access (WCDMA) system, general packet radio service (GPRS), a long term evolution (LIE) system, an advanced long term evolution (LIE-A) system, a universal mobile telecommunications system (UMTS), and an evolved long term evolution (eLTE) system.

Figure 1:
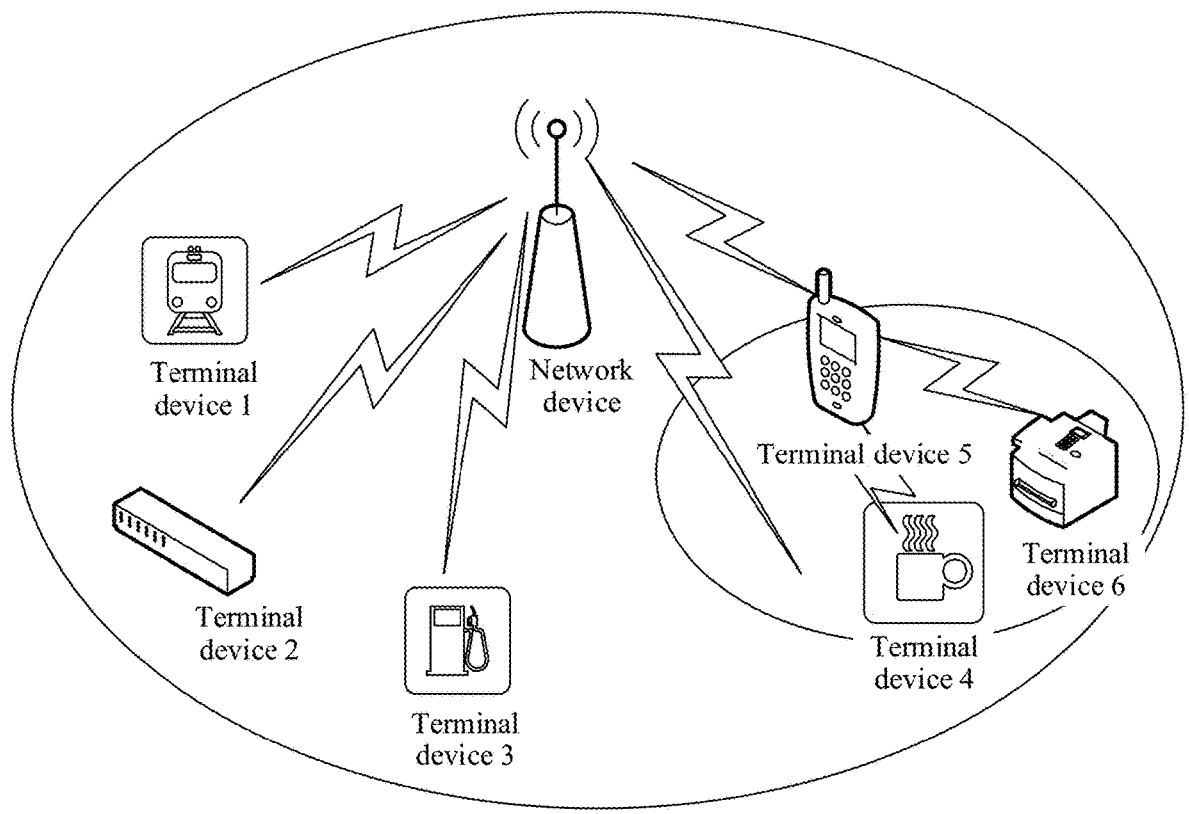
FIG. 1 is a schematic diagram of an example of a system architecture applicable to an embodiment of this application.

FIG. 1 is a schematic diagram of a system architecture applicable to an embodiment of this application. As shown in FIG. 1, a network device and terminal devices 1 to 6 constitute a communications system. In the communications system, the network device sends information to one or more of the terminal devices 1 to 6. In addition, the terminal devices 4 to 6 also constitute a communications system. In the communications system, the terminal device 5 may send information to one or both of the terminal device 4 and the terminal device 6.

In this embodiment of this application, a terminal device may communicate with a core network by using a network device. The terminal device may be user equipment (UE), an access terminal device, a subscriber unit, a subscriber station, a mobile station, a mobile console, a remote station, a remote terminal device, a mobile device, a user terminal device, a terminal device, a wireless communications device, a user agent, or a user apparatus. The access terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, or the like.

The network device may be referred to as a radio access network (RAN) device, and is collectively referred to as a network device below. The network device is mainly responsible for providing a wireless connection for a terminal device, to ensure reliable transmission of uplink and downlink data of the terminal device. The network device may be a gNB (generation Node B) in a 5G system, or may be a base transceiver station (BTS) in a global system for mobile communications (GSM) system or code division multiple access (CDMA), or may be a NodeB (NB) in a wideband code division multiple access (WCDMA) system, or may be an evolved NodeB (Evolutional Node B, eNB, or eNodeB) in a long term evolution (LTE) system, or the like.

In this embodiment of this application, the terminal device may operate in any one of a standalone mode, a guard band mode, and an in-band mode, and send a preamble to the network device when operating in any one of the foregoing modes. When operating in the standalone mode, the terminal device may transmit NB-IoT service data on one or more carriers in a GSM network, where a bandwidth of the independent carrier is 180 kHz.

Figure 2:
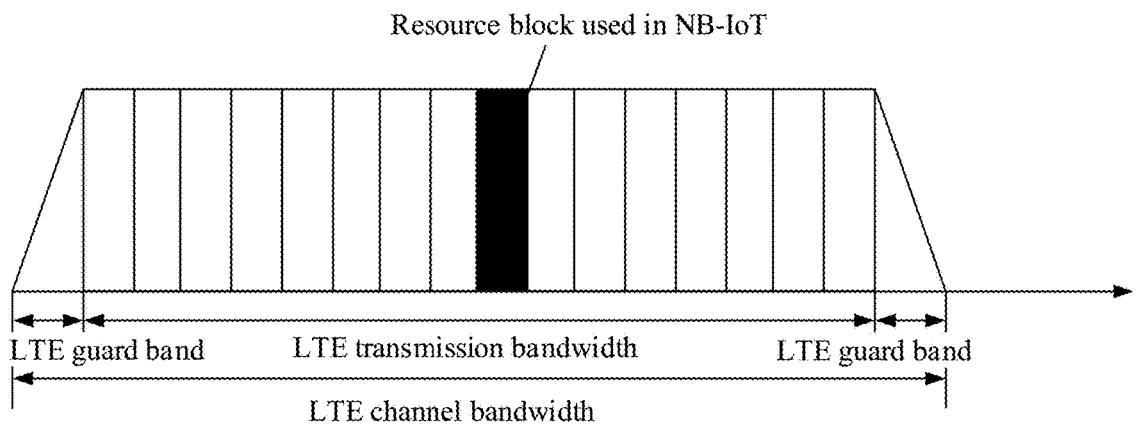
FIG. 2 is a schematic diagram of a bandwidth according to an embodiment of this application.

When operating in the in-band mode, the terminal device may transmit NB-IoT service data on one or more resource blocks on one carrier in an LTE system, where a bandwidth of one resource block is 180 kHz. Details may be shown in FIG. 2. In FIG. 2, one carrier in LIE may be divided into a plurality of resource blocks, a bandwidth of each resource block is 180 kHz, and a terminal device in NB-IoT may transmit NB-IoT service data by using one or more of the resource blocks.

Figure 3:
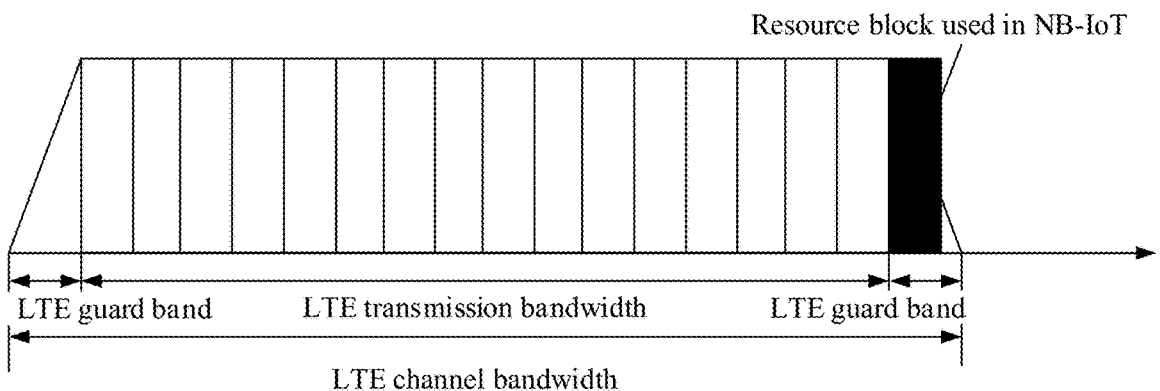
FIG. 3 is a schematic diagram of a bandwidth according to an embodiment of this application.

When operating in the guard band mode, the terminal device may transmit NB-IoT service data in a guard band of a carrier in the LTE system, where a bandwidth occupied by the guard band is 180 kHz. Details may be shown in FIG. 3. In FIG. 3, a terminal device in NB-IoT may transmit NB-IoT service data by using a guard bandwidth of a carrier in LTE.

Figure 4:
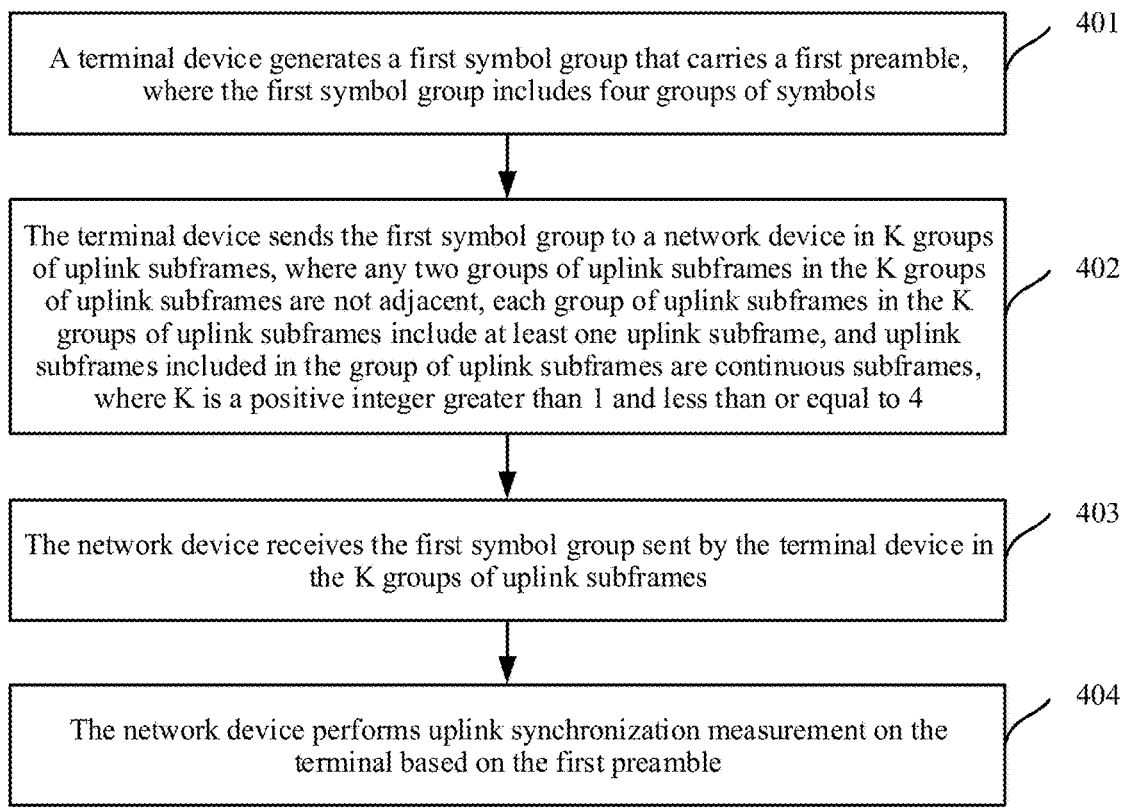
FIG. 4 is a schematic flowchart of a signal sending method according to an embodiment of this application.

With reference to the foregoing description, FIG. 4 is a schematic flowchart of a signal sending method according to an embodiment of this application. Referring to FIG. 4, the method includes the following steps.

Step 401: A terminal device generates a first symbol group that carries a first preamble, where the first symbol group includes four groups of symbols.

Step 402: The terminal device sends the first symbol group to a network device in K groups of uplink subframes, where any two groups of uplink subframes in the K groups of uplink subframes are not adjacent, each group of uplink subframes in the K groups of uplink subframes include at least one uplink subframe, and uplink subframes included in the group of uplink subframes are continuous subframes, where K is a positive integer greater than 1 and less than or equal to 4.

Any two groups of uplink subframes in the K groups of uplink subframes are not adjacent. In other words, the any two groups of uplink subframes in the K groups of uplink subframes are discontinuous in terms of time.

Step 403: The network device receives the first symbol group sent by the terminal device in the K groups of uplink subframes.

Step 404: The network device performs uplink synchronization measurement on the terminal based on the first preamble.

In step 401, the first preamble may be randomly selected by the terminal device from available preambles, or may be a preamble specified by the network device for the terminal device. This is not limited in this embodiment of this application.

Figure 5:
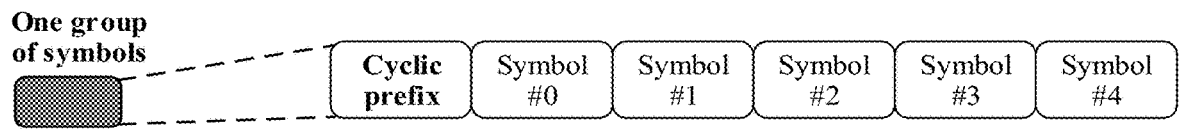
FIG. 5 is a schematic diagram of a symbol according to an embodiment of this application.

Each group of symbols in the first symbol group includes a cyclic prefix and five symbols. For details, refer to FIG. 5. In FIG. 5, a foremost part of a group of symbols is a cyclic prefix, the cyclic prefix has a time length of 66.7 μs or 266.67 μs, the cyclic prefix is followed by five symbols used to transmit a preamble, and each symbol has a time length of 266.67 μs. Each preamble requires 4 groups of symbols.

It should be noted that the symbol described in the embodiments of this application includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation, and details are not described herein.

In step 402, the K groups of uplink subframes may be located in a same radio frame. Certainly, the K groups of uplink subframes may not be located in a same radio frame.

In this embodiment of this application, each group of uplink subframes in the K groups of uplink subframes include at least one uplink subframe, and the at least one uplink subframe is a continuous subframe. The continuous subframes mean that the first subframe and the last subframe are continuous in terms of time. For example, one radio frame includes 10 subframes, and the 10 subframes included in the radio frame are continuous in terms of time, and may be considered as 10 continuous subframes. In this embodiment of this application, the NB-IOT technology needs to be compatible with the LIE system. Therefore, a subframe used in the NB-IOT technology may be a subframe defined in the LTE system.

Currently, a TDD LIE system has seven uplink-downlink configurations (Uplink-downlink configuration), which are respectively an uplink-downlink configuration 0 to an uplink-downlink configuration 6. A subframe for transmitting a downlink signal is a downlink subframe, and is represented by D. The subframe for transmitting an uplink signal is an uplink subframe, and is represented by U. The downlink subframe and the uplink subframe are separated by a special subframe, and the special subframe is represented by S. For specific content of the seven uplink-downlink configurations, refer to Table 1.

TABLE 1

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | S | S | S |

With reference to Table 1, in an NB-IOT technology, in K groups of uplink subframes used by a terminal device to send a preamble, each group of uplink subframes may include one uplink subframe, or may include two continuous uplink subframes, or may include three continuous uplink subframes.

It should be noted that the group of uplink subframes in the K groups of uplink subframes are used to send at least one group of symbols in a first symbol group. When a group of uplink subframes in the K groups of uplink subframes include one uplink subframe, to enable the terminal device to send a group of symbols in the first symbol group in the group of uplink subframes, based on a feature that a subcarrier spacing is inversely proportional to a time length of a symbol, a subcarrier spacing of the group of uplink subframes may be increased to reduce a time length of a symbol. Therefore, more symbols are transmitted in the group of uplink subframes. For example, the subcarrier spacing of the group of uplink subframes is adjusted from 15 kHz to 30 kHz, so that a quantity of symbols transmitted in each uplink subframe in the group of uplink subframes increases from 14 to 28. Certainly, symbols in a group of symbols may alternatively be divided. For example, in a group of uplink subframes, only the first four symbols in a group of symbols in the first symbol group are sent, and the last symbol in the group of symbols and another group of symbols are sent in another group of uplink subframes.

In this embodiment of this application, uplink subframes included in any group of uplink subframes in the K groups of uplink subframes include at least one uplink subframe included in the first 5 ms of a radio frame, or at least one uplink subframe included in the last 5 ms of a radio frame. With reference to Table 1, for example, an uplink-downlink configuration type of a radio frame is an uplink-downlink configuration 0, and uplink subframes in the first 5 ms of the radio frame are a subframe 2, a subframe 3, and a subframe 4; and for any group of uplink subframes in the K groups of uplink subframes, the group of uplink subframes may include the subframe 2 in the radio frame, or include the subframe 2 and the subframe 3 in the radio frame, or include the subframe 2, the subframe 3, and the subframe 4 in the radio frame.

For another example, an uplink-downlink configuration type of a radio frame is an uplink-downlink configuration 1, and uplink subframes in the last 5 ms of the radio frame are a subframe 7 and a subframe 8; and for any group of uplink subframes in the K groups of uplink subframes, the group of uplink subframes may include the subframe 7 in the radio frame, or include the subframe 7 and the subframe 8 in the radio frame.

In this embodiment of this application, K may be 2, 3, or 4, and separate descriptions are provided below.

In a first case, K is 2.

In this case, each group of uplink subframes in the K groups of uplink subframes may be used to send two groups of symbols in the first symbol group, or one group of uplink subframes in the K groups of uplink subframes may be used to send three groups of symbols in the first symbol group and the other group of uplink subframes may be used to send one group of symbols of the first symbol group, so that four groups of symbols of the first symbol group are sent in the K groups of uplink subframes.

Figure 6:
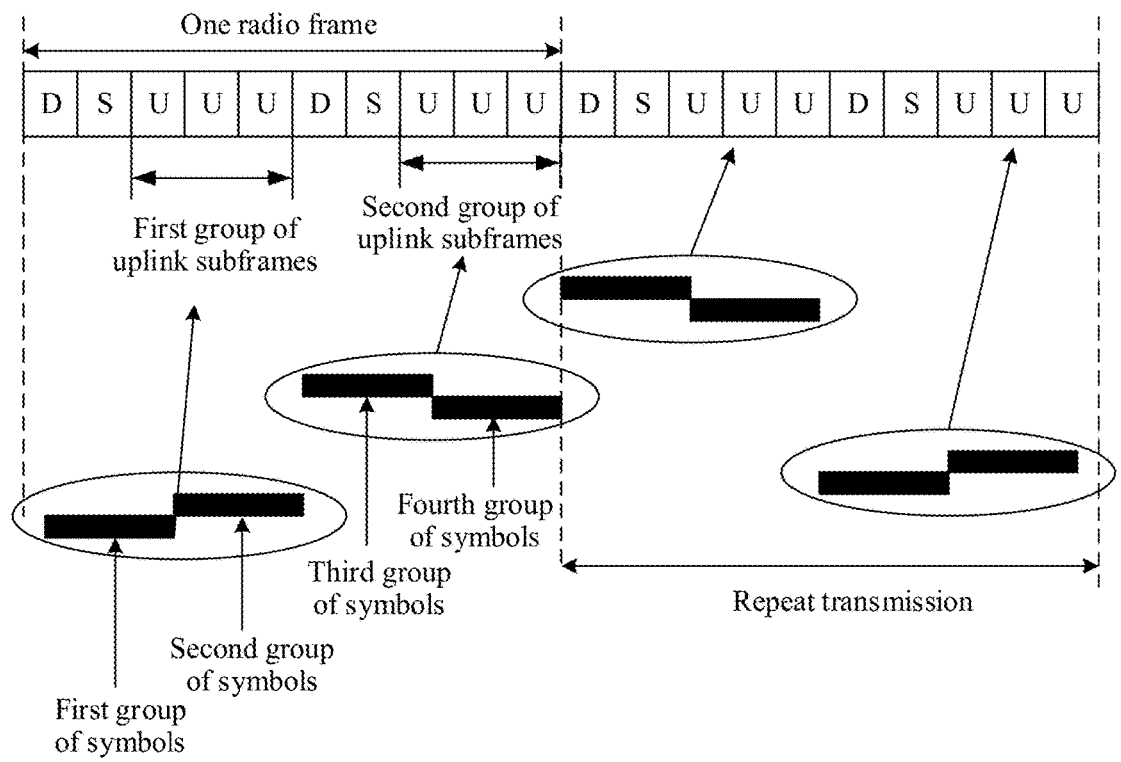
FIG. 6 is a schematic diagram of sending a preamble according to an embodiment of this application.

Specifically, FIG. 6 is a schematic diagram of sending a preamble according to an embodiment of this application.

In FIG. 6, a first symbol group that carries a first preamble includes the first group of symbols, the second group of symbols, the third group of symbols, and the fourth group of symbols. When K is 2, K groups of uplink subframes include the first group of uplink subframes and the second group of uplink subframes, the K groups of uplink subframes may be located in a same radio frame, and each group of uplink subframes in the K groups of uplink subframes include three continuous uplink subframes. The first group of uplink subframes in the K groups of uplink subframes are used to send the first group of symbols and the second group of symbols, and the second group of uplink subframes in the K groups of uplink subframes are used to send the third group of symbols, and the fourth group of symbols.

It should be noted that one preamble may be repeatedly sent for a plurality of times. With reference to FIG. 6, a terminal device may repeatedly send a preamble for a plurality of times in a manner in FIG. 6 by using a time length of one radio frame as a period.

In a second case, K is 3.

In this case, in the K groups of uplink subframes, one group of uplink subframes may be used to send two groups of symbols in the first symbol group, and each group of uplink subframes in the other two groups of uplink subframes may be used to send one group of symbols in the first symbol group.

Figure 7:
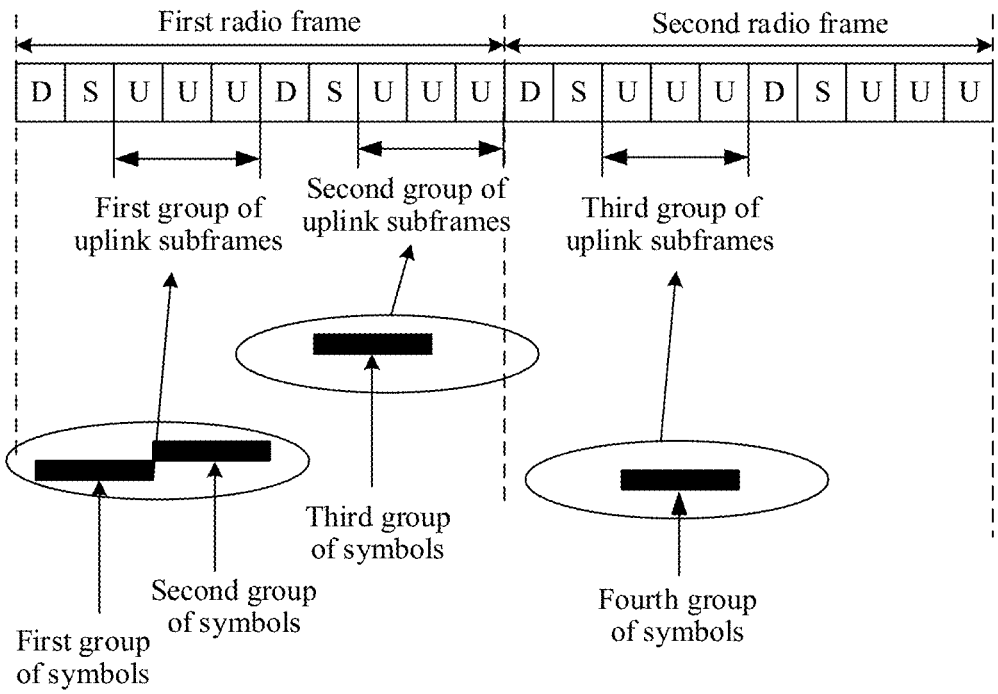
FIG. 7 is a schematic diagram of sending a preamble according to an embodiment of this application.

Specifically, FIG. 7 is a schematic diagram of sending a preamble according to an embodiment of this application.

In FIG. 7, a first symbol group that carries a first preamble includes the first group of symbols, the second group of symbols, the third group of symbols, and the fourth group of symbols. When K is 3, the K groups of uplink subframes include the first group of uplink subframes, the second group of uplink subframes, and the third group of uplink subframes, the K groups of uplink subframes are located in two radio frames, and each group of uplink subframes in the K groups of uplink subframes include three continuous uplink subframes. The first group of uplink subframes in the K groups of uplink subframes are used to send the first group of symbols and the second group of symbols, the second group of uplink subframes in the K groups of uplink subframes are used to send the third group of symbols, and the third group of uplink subframes in the K groups of uplink subframes are used to send the fourth group of symbols.

It should be noted that one preamble may be repeatedly sent for a plurality times. With reference to FIG. 7, a terminal device may repeatedly send a preamble for a plurality of times in a manner in FIG. 7 by using time lengths of two radio frames as a period.

In a third case, K is 4.

In this case, each group of uplink subframes in the K groups of uplink subframes are used to send one group of symbols in the first symbol group.

Figure 8:
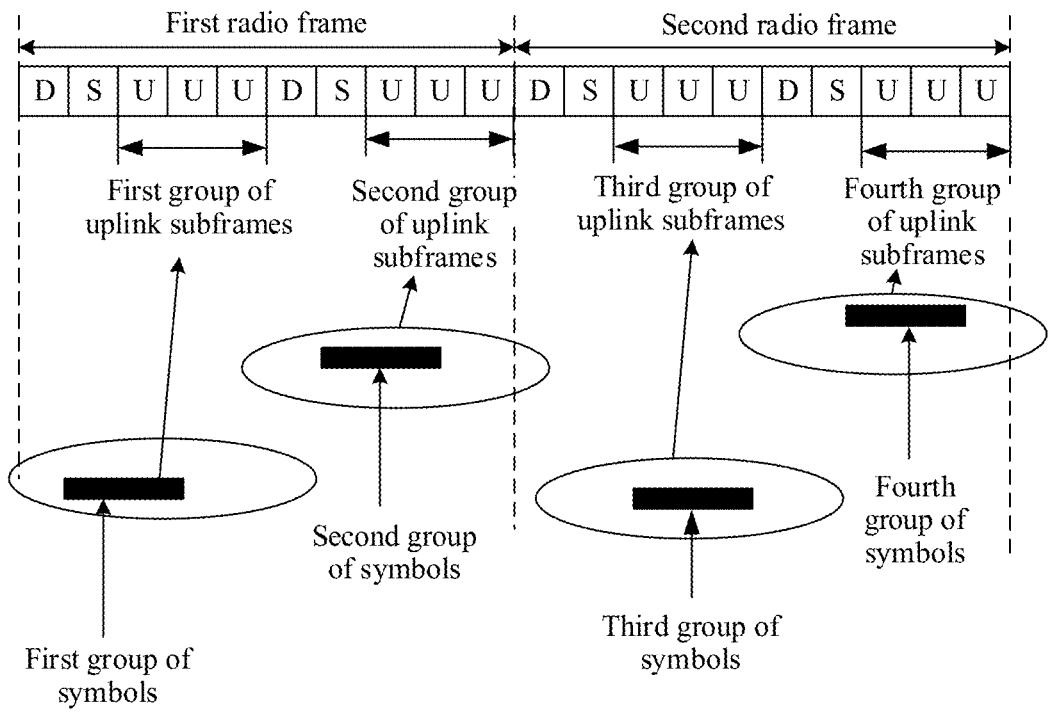
FIG. 8 is a schematic diagram of sending a preamble according to an embodiment of this application.

Specifically, FIG. 8 is a schematic diagram of sending a preamble according to an embodiment of this application.

In FIG. 8, a first symbol group that carries a first preamble includes the first group of symbols, the second group of symbols, the third group of symbols, and the fourth group of symbols. When K is 8, the K groups of uplink subframes include the first group of uplink subframes, the second group of uplink subframes, the third group of uplink subframes, and the fourth group of uplink subframes, the K groups of uplink subframes are located in two radio frames, and each group of uplink subframes in the K groups of uplink subframes include three continuous uplink subframes. The first group of uplink subframes in the K groups of uplink subframes are used to send the first group of symbols, the second group of uplink subframes in the K groups of uplink subframes are used to send the second group of symbols, the third group of uplink subframes in the K groups of uplink subframes are used to send the third group of symbols, and the fourth group of uplink subframes in the K groups of uplink subframes are used to send the fourth group of symbols.

It should be noted that one preamble may be repeatedly sent for a plurality times. With reference to FIG. 8, a terminal device may repeatedly send a preamble for a plurality of times in a manner in FIG. 8 by using time lengths of two radio frames as a period.

Figure 9:
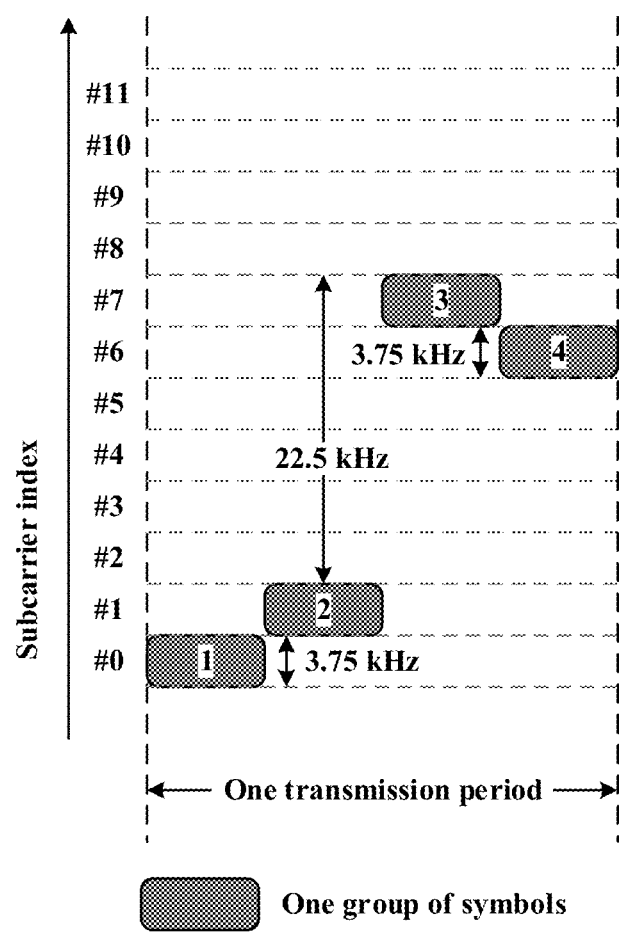
FIG. 9 is a schematic diagram of frequency hopping of a preamble according to an embodiment of this application.

It should be noted that in this embodiment of this application, four groups of symbols that carry a preamble are transmitted on a PRACH through frequency hopping. Specifically, FIG. 9 is a schematic diagram of frequency hopping of a preamble according to an embodiment of this application. In FIG. 9, in a transmission period of each preamble, four groups of symbols that carry the preamble are represented by using gray rectangles and digits, and are denoted as 1, 2, 3, and 4 in a time sequence. The preamble has two frequency hopping intervals, which are respectively 3.75 kHz and 22.5 kHz, on a PRACH within one sending period. The frequency hopping interval is an integer multiple of the subcarrier bandwidth, and a minimum frequency hopping interval and the subcarrier bandwidth are the same. A frequency hopping interval between the first group of symbols and the second group of symbols is 3.75 kHz, and a frequency hopping interval between the third group of symbols and the fourth group of symbols is 22.5 kHz. A frequency hopping interval between the second group of symbols and the third group of symbols is 22.5 kHz. Pseudo random frequency hopping is used between two adjacent sending periods, and a frequency hopping range is limited to 12 subcarriers.

Optionally, in this embodiment of this application, a terminal device may simultaneously send a plurality of preambles. For example, the terminal device may randomly select two preambles from a preamble set, and send the selected two preambles in the K groups of uplink subframes. Subcarriers of symbol groups carrying the preambles are different.

With reference to the foregoing description, the terminal device may send a second symbol group to the network device in the K groups of uplink subframes, where the second symbol group is used to carry a second preamble. Similarly, the second symbol group also includes four groups of symbols. For details, refer to the description of the first symbol group, and details are not described herein again.

In this embodiment of this application, a difference between an initial subcarrier number corresponding to the second preamble and an initial subcarrier number corresponding to the first preamble may be a preset value. An initial subcarrier number corresponding to each preamble may uniquely determine the preamble. Therefore, after determining the first preamble, the terminal device may uniquely determine the second preamble. The preset value may be determined based on an actual situation, and details are not described herein.

The second preamble may also be a preamble that is different from the first preamble and that is randomly selected by the terminal device from a preamble set, the preamble set includes at least two preambles, and the preambles in the preamble set are configured by the network device for the terminal device. The preambles in the preamble set may be a universal set of all optional preambles of the terminal device, or may be a subset of a set including all preambles configured by the network device, for example, the preambles included in the preamble set are all preambles whose differences between initial subcarrier numbers corresponding to the preambles and the initial subcarrier number corresponding to the first preamble are not less than a preset threshold.

Figure 10:
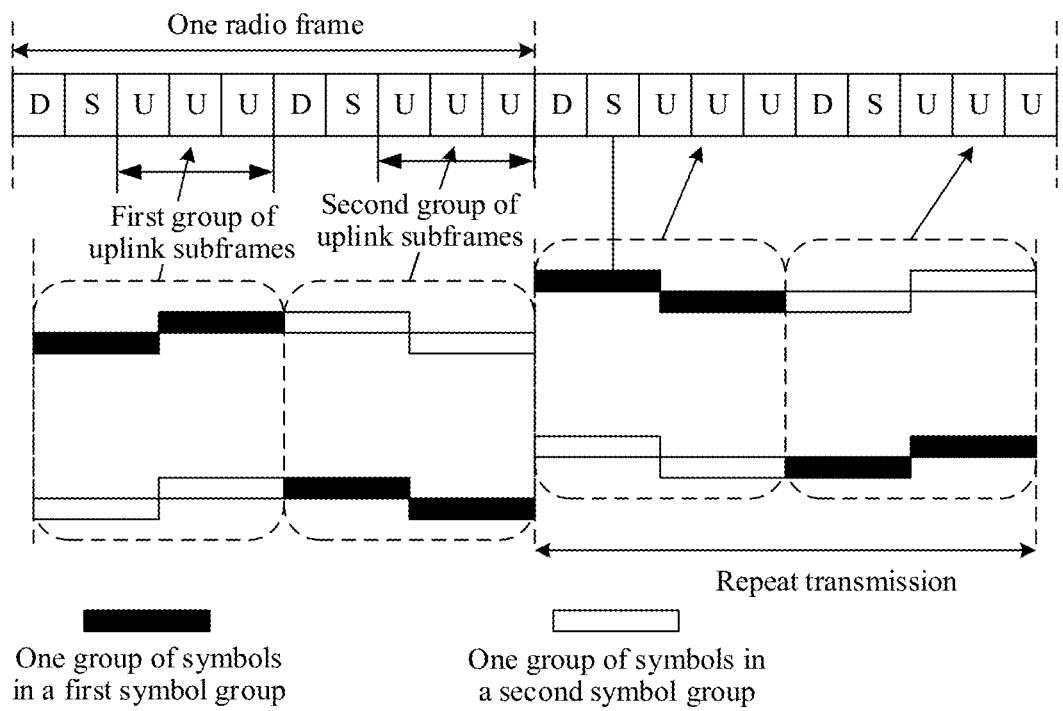
FIG. 10 is a schematic diagram of sending a preamble according to an embodiment of this application.

FIG. 10 is a schematic diagram of sending a preamble according to an embodiment of this application. In FIG. 10, when K is 2, K groups of uplink subframes include the first group of uplink subframes and the second group of uplink subframes, the K groups of uplink subframes may be located in a same radio frame, and each group of uplink subframes in the K groups of uplink subframes include three continuous uplink subframes. A first symbol group that carries a first preamble includes the first group of symbols, the second group of symbols, the third group of symbols, and the fourth group of symbols. The first group of uplink subframes in the K groups of uplink subframes are used to send the first two groups of symbols in the first symbol group that carries the first preamble and the first two groups of symbols in a second symbol group that carries a second preamble, and the second group of uplink subframes in the K groups of uplink subframes are used to send the last two groups of symbols in the first symbol group that carries the first preamble and the last two groups of symbols in the second symbol group that carries the second preamble. The symbol in the first symbol group and the symbol in the second symbol group are located on different subcarriers during transmission.

It should be noted that one preamble may be repeatedly sent for a plurality times. With reference to FIG. 10, a terminal device may repeatedly send the first preamble and the second preamble for a plurality of times in a manner in FIG. 10 by using a time length of one radio frame as a period.

Finally, after the network device receives the first preamble sent by the terminal device in step 403, in step 404, the network device performs uplink synchronization measurement on the terminal device based on the first preamble. Specific content of the uplink synchronization measurement is not limited in the embodiments of this application. For example, a difference between an actual time at which a signal sent by the terminal device arrives at the network device and a time predicted by the network device may be measured, so that the network device can perform uplink synchronization for the terminal device based on the difference.

When receiving the second preamble, the network device may perform uplink synchronization measurement on the terminal device based on the second preamble at the same time, to perform uplink synchronization on the terminal by using two preambles, thereby reducing impact of a frequency offset on uplink synchronization performance, and improving uplink synchronization precision.

Figure 11:
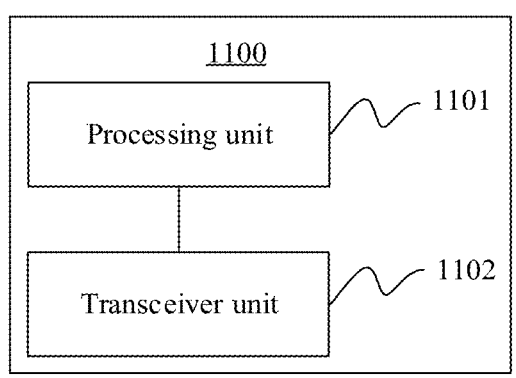
FIG. 11 is a schematic structural diagram of a terminal device according to an embodiment of this application.

FIG. 11 is a schematic structural diagram of a terminal device according to an embodiment of this application. The terminal device may be configured to perform actions of the terminal device in the foregoing method embodiments. The terminal device 1100 includes a processing unit 1101 and a transceiver unit 1102.

The processing unit 1101 is configured to generate a first symbol group that carries a first preamble, where the first symbol group includes four groups of symbols.

The transceiver unit 1102 is configured to send the first symbol group generated by the processing unit 1101 to a network device in K groups of uplink subframes, where any two groups of uplink subframes in the K groups of uplink subframes are not adjacent, each group of uplink subframes in the K groups of uplink subframes include at least one uplink subframe, and uplink subframes included in the group of uplink subframes are continuous subframes, where K is a positive integer greater than 1 and less than or equal to 4.

In an optional implementation, K is 2; and
each group of uplink subframes in the K groups of uplink subframes are used to send two groups of symbols in the first symbol group.

In an optional implementation, K is 4; and
each group of uplink subframes in the K groups of uplink subframes are used to send one group of symbols in the first symbol group.

In an optional implementation, the transceiver unit 1102 is further configured to:
send a second symbol group to the network device in the K groups of uplink subframes, where the second symbol group is used to carry a second preamble.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

Figure 12:
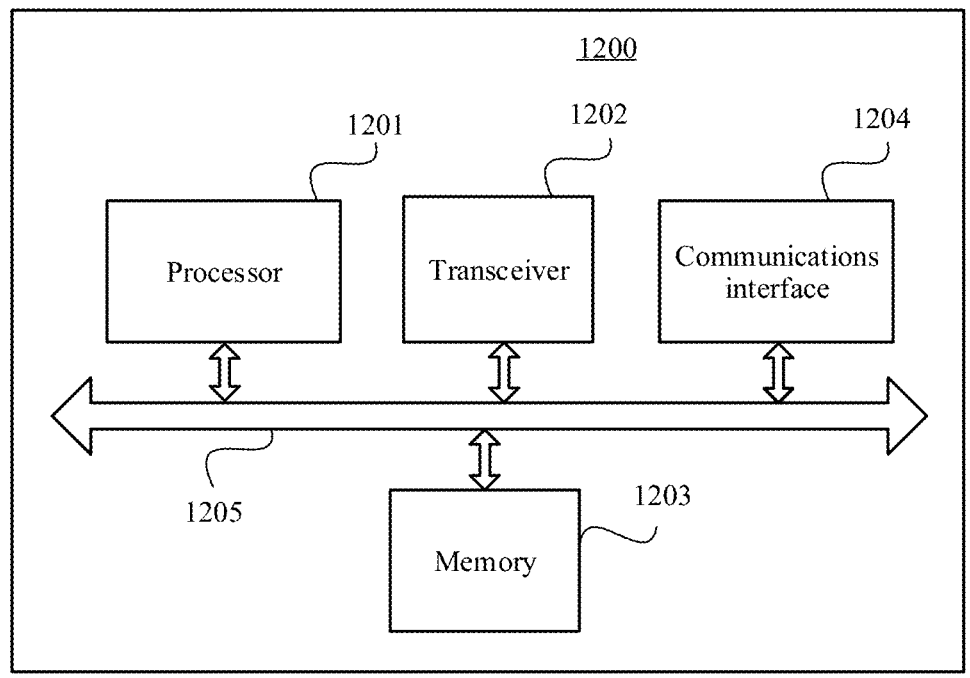
FIG. 12 is a schematic structural diagram of a terminal device according to an embodiment of this application.

FIG. 12 is a schematic structural diagram of a terminal device according to an embodiment of this application. The terminal device may be configured to perform actions of the terminal device in the foregoing method embodiments. The terminal device 1200 includes a processor 1201, a transceiver 1202, a memory 1203, and a communications interface 1204. The processor 1201, the transceiver 1202, the memory 1203, and the communications interface 1204 are connected to each other by using a bus 1205.

The processor 1201 may be a central processing unit (CPU), a network processor (NP), or a combination of a CPU and an NP. The processor 1201 may further include a hardware chip. The hardware chip may be an application-specific integrated circuit (ASIC), a programmable logic device (PLD), or a combination thereof. The PLD may be a complex programmable logic device (CPLD), a field programmable gate array (FPGA), generic array logic (GAL), or any combination thereof.

The memory 1203 may include a volatile memory, for example, a random access memory (RAM); or the memory may include a non-volatile memory, for example, a flash memory, a hard disk drive (HDD), or a solid-state drive (SSD); or the memory 1203 may include a combination of the foregoing types of memories.

The communications interface 1204 may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The bus 1205 may be a peripheral component interconnect (PCI) bus, an extended industry standard architecture (EISA) bus, or the like. The bus may be classified into an address bus, a data bus, a control bus, and the like. For ease of indication, the bus is indicated by using only one double-headed arrow in FIG. 12. However, it does not indicate that there is only one bus or only one type of bus.

The memory 1203 may be configured to store a program instruction. The processor 1201 invokes the program instruction stored in the memory 1203, and may perform one or more steps in the embodiments shown in the foregoing solutions, or an optional implementation thereof, so that an access network node 1200 implements a function in the foregoing methods.

The processor 1201 is configured to generate a first symbol group that carries a first preamble, where the first symbol group includes four groups of symbols.

The transceiver 1202 is configured to send the first symbol group generated by the processing unit 1201 to a network device in K groups of uplink subframes, where any two groups of uplink subframes in the K groups of uplink subframes are not adjacent, each group of uplink subframes in the K groups of uplink subframes include at least one uplink subframe, and uplink subframes included in the group of uplink subframes are continuous subframes, where K is a positive integer greater than 1 and less than or equal to 4.

In an optional implementation, K is 2; and
each group of uplink subframes in the K groups of uplink subframes are used to send two groups of symbols in the first symbol group.

In an optional implementation, K is 4; and
each group of uplink subframes in the K groups of uplink subframes are used to send one group of symbols in the first symbol group.

In an optional implementation, the transceiver 1202 is further configured to:
send a second symbol group to the network device in the K groups of uplink subframes, where the second symbol group is used to carry a second preamble.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

Figure 13:
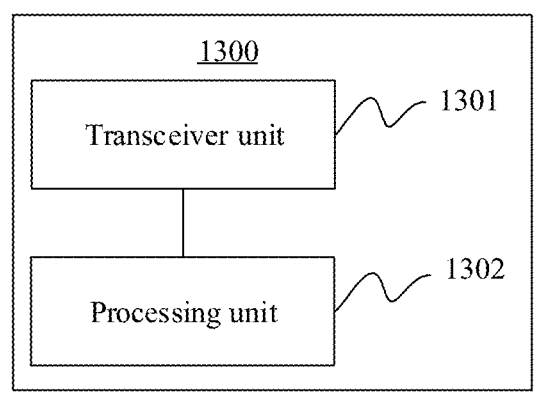
FIG. 13 is a schematic structural diagram of a network device according to an embodiment of this application.

FIG. 13 is a schematic structural diagram of a network device according to an embodiment of this application. The network device may be configured to perform actions of the network device in the foregoing method embodiments. The network device 1300 includes a transceiver unit 1301 and a processing unit 1302.

The transceiver unit 1301 is configured to receive a first symbol group sent by a terminal device in K groups of uplink subframes, where any two groups of uplink subframes in the K groups of uplink subframes are not adjacent; the first symbol group is used to carry a first preamble, and the first symbol group includes four groups of symbols; and each group of uplink subframes in the K groups of uplink subframes include at least one uplink subframe, and uplink subframes included in the group of uplink subframes are continuous subframes, where K is a positive integer greater than 1 and less than or equal to 4.

The processing unit 1302 is configured to perform uplink synchronization measurement on the terminal based on the first preamble.

In an optional implementation, K is 2; and
each group of uplink subframes in the K groups of uplink subframes are used to send two groups of symbols in the first symbol group.

In an optional implementation, K is 4; and
each group of uplink subframes in the K groups of uplink subframes are used to send one group of symbols in the first symbol group.

In an optional implementation, the transceiver unit 1301 is further configured to:
receive a second symbol group in the K groups of uplink subframes, where the second symbol group is used to carry a second preamble.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

Figure 14:
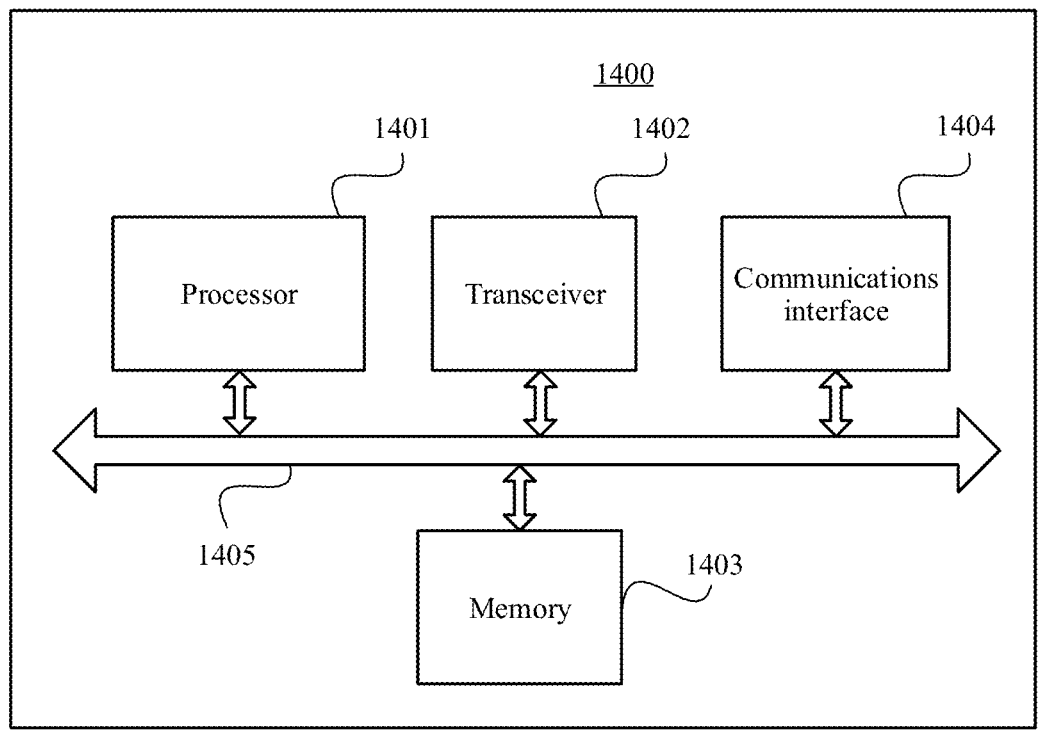
FIG. 14 is a schematic structural diagram of a network device according to an embodiment of this application.

FIG. 14 is a schematic structural diagram of a network device according to an embodiment of this application. The network device may be configured to perform actions of the network device in the foregoing method embodiments. The network device 1400 includes a processor 1401, a transceiver 1402, a memory 1403, and a communications interface 1404. The processor 1401, the transceiver 1402, the memory 1403, and the communications interface 1404 are connected to each other by using a bus 1405. For specific content of the foregoing modules, refer to descriptions of related modules in FIG. 12, and details are not described herein again.

The memory 1403 may be configured to store a program instruction. The processor 1401 invokes the program instruction stored in the memory 1403.

The transceiver 1402 is configured to receive a first symbol group sent by a terminal device in K groups of uplink subframes, where any two groups of uplink subframes in the K groups of uplink subframes are not adjacent; the first symbol group is used to carry a first preamble, and the first symbol group includes four groups of symbols; and each group of uplink subframes in the K groups of uplink subframes include at least one uplink subframe, and uplink subframes included in the group of uplink subframes are continuous subframes, where K is a positive integer greater than 1 and less than or equal to 4.

The processor 1401 is configured to perform uplink synchronization measurement on the terminal based on the first preamble.

In an optional implementation, K is 2; and
each group of uplink subframes in the K groups of uplink subframes are used to send two groups of symbols in the first symbol group.

In an optional implementation, K is 4; and
each group of uplink subframes in the K groups of uplink subframes are used to send one group of symbols in the first symbol group.

In an optional implementation, the transceiver 1402 is further configured to:
receive a second symbol group in the K groups of uplink subframes, where the second symbol group is used to carry a second preamble.

In an optional implementation, a difference between an initial subcarrier number corresponding to the second preamble and an initial subcarrier number corresponding to the first preamble is a preset value.

In an optional implementation, the second preamble is a preamble that is different from the first preamble and that is randomly selected by the terminal device from a preamble set, the preamble set includes at least two preambles, and the preambles in the preamble set are configured by the network device for the terminal device.

For related parts between the method embodiments of this application, refer to each other. The apparatus provided in each apparatus embodiment is configured to perform the method provided in the corresponding method embodiment. Therefore, each apparatus embodiment may be understood with reference to a related part in a related method embodiment.

A person of ordinary skill in the art can understand that all or some of the steps of the method in the foregoing embodiments may be implemented by a program instructing related hardware. The program may be stored in a readable storage medium of a device such as a magnetic disk storage, or an optical memory. When the program is run, the program executes all or some of the steps described above.

In the foregoing specific implementations, the objective, technical solutions, and benefits of this application are further described in detail. It should be understood that different embodiments can be combined. The foregoing descriptions are merely specific implementations of this application, but are not intended to limit the protection scope of this application. Any combination, modification, equivalent replacement, or improvement made without departing from the spirit and principle of this application should fall within the protection scope of this application.

What is claimed is:
1. A signal sending method comprising:
generating, by a terminal device, a first symbol group that carries a first preamble, wherein the first symbol group comprises four groups of symbols, wherein each group of symbols in the first symbol group includes a cyclic prefix and five symbols;
sending, by the terminal device, the first symbol group to a network device in K groups of uplink subframes,
wherein any two groups of uplink subframes in the K groups of uplink subframes are not adjacent and separated by at least a subframe that is not an uplink subframe,
wherein each group of uplink subframes in the K groups of uplink subframes comprise at least one uplink subframe which are continuous subframes, and
wherein K is a positive integer greater than 1 and less than or equal to 4; and
sending, by the terminal device, additionally to the first symbol group, a second symbol group to the network device in the K groups of uplink subframes,
wherein the second symbol group is a second preamble,
wherein the second preamble is a preamble that is different from the first preamble,
wherein the second preamble is randomly selected by the terminal device from a preamble set,
wherein the preamble set comprises at least two preambles, and
wherein the at least two preambles in the preamble set are configured by the network device for the terminal device.

2. The signal sending method according to claim 1, wherein a difference between an initial subcarrier number corresponding to the second preamble and an initial subcarrier number corresponding to the first preamble is a preset value.

3. The signal sending method according to claim 1, wherein K is 2; and
each group of uplink subframes in the K groups of uplink subframes are used to send two groups of symbols in the first symbol group.

4. The signal sending method according to claim 1, wherein K is 4; and
each group of uplink subframes in the K groups of uplink subframes are used to send one group of symbols in the first symbol group.

5. The signal sending method according to claim 2, wherein uplink subframes comprised in any group of uplink subframes in the K groups of uplink subframes comprise one of the following (a) and (b):
(a) at least one uplink subframe that is in first 5 ms in a radio frame, and
(b) at least one uplink subframe that is in last 5 ms in a radio frame.

6. The signal sending method according to claim 1, wherein each group of uplink subframes in the K groups of uplink subframes is used to send two groups of symbols in the first symbol group, wherein a first group of uplink subframes is used to send a first two groups of symbols in the first symbol group that carries the first preamble and a first two groups of symbols in the second symbol group that carries the second preamble, and wherein a second group of uplink subframes is used to send a last two groups of symbols in the first symbol group that carries the first preamble and a last two groups of symbols in the second symbol group that carries the second preamble.

7. The signal sending method according to claim 1, the symbol in the first symbol group and the symbol in the second symbol group are located on different subcarriers during transmission.

8. A signal receiving method comprising:
receiving, by a network device, a first symbol group sent by a terminal device in K groups of uplink subframes,
wherein any two groups of uplink subframes in the K groups of uplink subframes are not adjacent and separated by at least a subframe that is not an uplink subframe,
wherein the first symbol group carries a first preamble and comprises four groups of symbols,
wherein each group of symbols in the first symbol group includes a cyclic prefix and five symbols,
wherein each group of uplink subframes in the K groups of uplink subframes comprise at least one uplink subframe which are continuous subframes, and
wherein K is a positive integer greater than 1 and less than or equal to 4;
receiving, by the network device, additionally to the first symbol group, a second symbol group sent by the terminal device in the K groups of uplink subframes,
wherein the second symbol group is a second preamble,
wherein the second preamble is a preamble that is different from the first preamble,
wherein the second preamble is randomly selected by the terminal device from a preamble set,
wherein the preamble set comprises at least two preambles, and
wherein the at least two preambles in the preamble set are configured by the network device for the terminal device; and
performing, by the network device, uplink synchronization measurement on the terminal device based on the first preamble.

9. The signal receiving method according to claim 8, wherein a difference between an initial subcarrier number corresponding to the second preamble and an initial subcarrier number corresponding to the first preamble is a preset value.

10. The signal receiving method according to claim 8, wherein K is 2; and each group of uplink subframes in the K groups of uplink subframes are used to send two groups of symbols in the first symbol group.

11. The signal receiving method according to claim 8, wherein K is 4; and each group of uplink subframes in the K groups of uplink subframes are used to send one group of symbols in the first symbol group.

12. The signal receiving method according to claim 8, wherein uplink subframes comprised in any group of uplink subframes in the K groups of uplink subframes comprise one of the following (a) and (b):
(a) at least one uplink subframe that is in first 5 ms in a radio frame, and
(b) at least one uplink subframe that is in last 5 ms in a radio frame.

13. A terminal device comprising:
a processor configured to generate a first symbol group that carries a first preamble and a second symbol group that carried a second preamble,
wherein the second preamble is a preamble that is different from the first preamble,
wherein the second preamble is randomly selected by the terminal device from a preamble set,
wherein the preamble set comprises at least two preambles, and
wherein the at least two preambles in the preamble set are configured by the network device for the terminal device, wherein the first symbol group comprises four groups of symbols, and wherein each group of symbols in the first symbol group includes a cyclic prefix and five symbols; and a transceiver configured to cooperate with the processor to
send the first symbol group generated by the processor to a network device in K groups of uplink subframes, and send the second symbol group generated by the processor to the network device in K groups of uplink subframes after sending the first symbol, wherein any two groups of uplink subframes in the K groups of uplink subframes are not adjacent and separated by at least a subframe that is not an uplink subframe, wherein each group of uplink subframes in the K groups of uplink subframes comprise at least one uplink subframe which are continuous subframes, and wherein K is a positive integer greater than 1 and less than or equal to 4.

14. The terminal device according to claim 13, wherein a difference between an initial subcarrier number corresponding to the second preamble and an initial subcarrier number corresponding to the first preamble is a preset value.

15. The terminal device according to claim 13, wherein each group of uplink subframes in the K groups of uplink subframes is used to send two groups of symbols in the first symbol group, wherein a first group of uplink subframes is used to send a first two groups of symbols in the first symbol group that carries the first preamble and a first two groups of symbols in the second symbol group that carries the second preamble, and wherein a second group of uplink subframes is used to send a last two groups of symbols in the first symbol group that carries the first preamble and a last two groups of symbols in the second symbol group that carries the second preamble.

16. The terminal device according to claim 13, wherein the symbol in the first symbol group and the symbol in the second symbol group are located on different subcarriers during transmission.

17. A network device comprising:
a transceiver configured to cooperate with a processor to receive a first symbol group sent by a terminal device in K groups of uplink subframes, and thereafter a second symbol group in the K groups of uplink subframes sent by the terminal device in K groups of uplink subframes, wherein any two groups of uplink subframes in the K groups of uplink subframes are not adjacent and separated by at least a subframe that is not an uplink subframe, wherein the first symbol group carries a first preamble and comprises four groups of symbols wherein the second symbol group carries a second preamble, wherein each group of symbols in the first symbol group includes a cyclic prefix and five symbols, wherein each group of uplink subframes in the K groups of uplink subframes comprise at least one uplink subframe which are continuous subframes, wherein K is a positive integer greater than 1 and less than or equal to 4, wherein the second preamble is a preamble that is different from the first preamble, wherein the second preamble is randomly selected by the terminal device from a preamble set, wherein the preamble set comprises at least two preambles, and wherein the at least two preambles in the preamble set are configured by the network device for the terminal device; and the processor configured to perform uplink synchronization measurement on the terminal device based on the first preamble.

18. The network device according to claim 17, wherein a difference between an initial subcarrier number corresponding to the second preamble and an initial subcarrier number corresponding to the first preamble is a preset value.

19. The network device according to claim 17, wherein each group of uplink subframes in the K groups of uplink subframes is used to send two groups of symbols in the first symbol group, wherein a first group of uplink subframes is used to send a first two groups of symbols in the first symbol group that carries the first preamble and a first two groups of symbols in the second symbol group that carries the second preamble, and wherein a second group of uplink subframes is used to send a last two groups of symbols in the first symbol group that carries the first preamble and a last two groups of symbols in the second symbol group that carries the second preamble.

20. The network device according to claim 17, wherein the symbol in the first symbol group and the symbol in the second symbol group are located on different subcarriers during transmission.

* * * * *